US008876149B2

(12) United States Patent
Wilson

(10) Patent No.: US 8,876,149 B2
(45) Date of Patent: Nov. 4, 2014

(54) CHAIR WITH HEIGHT ADJUSTABLE MAST

(75) Inventor: William Hugh Wilson, Belfast (GB)

(73) Assignee: Mi-Care Solutions Limited (GB)

( * ) Notice: Subject to any disclaimer, the term of this patent is extended or adjusted under 35 U.S.C. 154(b) by 282 days.

(21) Appl. No.: 13/498,034

(22) PCT Filed: Jun. 21, 2010

(86) PCT No.: PCT/GB2010/001222
§ 371 (c)(1),
(2), (4) Date: Mar. 23, 2012

(87) PCT Pub. No.: WO2010/146376
PCT Pub. Date: Dec. 23, 2010

(65) Prior Publication Data

US 2012/0187663 A1 Jul. 26, 2012

(30) Foreign Application Priority Data

Jun. 19, 2009 (GB) .................................. 0910602.2

(51) Int. Cl.
*B62B 3/00* (2006.01)
*A61G 5/10* (2006.01)
*A61G 7/10* (2006.01)
*A61G 5/12* (2006.01)

(52) U.S. Cl.
CPC ............ *A61G 5/1002* (2013.01); *A61G 5/1059* (2013.01); *A61G 2005/125* (2013.01); *A61G 2005/122* (2013.01); *A61G 7/1059* (2013.01)
USPC .......................................................... 280/657

(58) Field of Classification Search
CPC ............. A61G 5/14; A61G 7/02; A61G 7/10; A61G 7/1019; A61G 7/1046; A61G 7/1059
USPC ............................ 280/250.1, 304.1, 638, 657
See application file for complete search history.

(56) References Cited

U.S. PATENT DOCUMENTS 3,654,643 A * 4/1972 Clanan ............................. 5/83.1
4,165,127 A * 8/1979 Vago ........................ 297/344.18
4,399,572 A * 8/1983 Johansson ........................ 5/87.1
4,435,863 A * 3/1984 Lerich .............................. 5/87.1
4,574,901 A * 3/1986 Joyner ......................... 180/65.1

(Continued)

FOREIGN PATENT DOCUMENTS

DE 36 15 412 11/1987
NL EP 1 894 553 3/2008

(Continued)

*Primary Examiner* — Hau Phan
*Assistant Examiner* — Jacob Meyer
(74) *Attorney, Agent, or Firm* — One3 IP Management, P.C.; Jeromye V. Sartain

(57) ABSTRACT

A height adjustable chair suitable for use by the disabled, frail or elderly, the chair comprising a chassis having a plurality of ground engaging wheels, a seat comprising a rear seat section, a seat cradle and a back support frame. The back support frame comprises a height adjustable mast that is affixed at its lower end to the chassis, and a cross member that is connected to the height adjustable mast and which extends substantially across the width of the chair. The mast and cross member being arranged so that the seat cradle can be raised relative the chassis and moved laterally relative the mast so that a person seated on the chair can be raised and lowered in order to facilitate toileting or delivery onto a bed.

15 Claims, 23 Drawing Sheets

(56) References Cited

U.S. PATENT DOCUMENTS

| | | | | | |
|---|---|---|---|---|---|
| 4,623,194 | A | * | 11/1986 | Pillot | 297/316 |
| 4,637,652 | A | * | 1/1987 | Bergenwall | 297/90 |
| 4,809,804 | A | * | 3/1989 | Houston et al. | 180/65.51 |
| 4,947,497 | A | * | 8/1990 | Marchand | 5/86.1 |
| 5,108,202 | A | * | 4/1992 | Smith | 297/330 |
| 5,112,076 | A | * | 5/1992 | Wilson | 280/657 |
| 5,161,812 | A | * | 11/1992 | DeWeese | 280/47.38 |
| 5,201,377 | A | * | 4/1993 | Wilson | 180/6.5 |
| 5,255,934 | A | * | 10/1993 | Wilson | 280/657 |
| 5,301,968 | A | * | 4/1994 | Ward et al. | 280/87.021 |
| 5,333,333 | A | * | 8/1994 | Mah | 5/87.1 |
| 5,366,036 | A | * | 11/1994 | Perry | 180/65.1 |
| 5,380,034 | A | * | 1/1995 | Wilson | 280/657 |
| 5,380,262 | A | * | 1/1995 | Austin | 482/68 |
| 5,388,289 | A | * | 2/1995 | Casperson | 5/86.1 |
| 5,423,562 | A | * | 6/1995 | Pearce, Jr. | 280/250.1 |
| 5,556,120 | A | * | 9/1996 | Davis | 280/304.1 |
| 5,708,993 | A | * | 1/1998 | Campbell et al. | 5/86.1 |
| 5,758,371 | A | * | 6/1998 | VanDyke et al. | 5/86.1 |
| 5,884,935 | A | * | 3/1999 | Tholkes | 280/657 |
| 5,984,411 | A | * | 11/1999 | Galumbeck | 297/344.15 |
| 6,092,247 | A | * | 7/2000 | Wilson | 5/86.1 |
| 6,125,957 | A | * | 10/2000 | Kauffmann | 180/65.1 |
| 6,224,154 | B1 | * | 5/2001 | Stoki | 297/339 |
| 6,430,761 | B1 | * | 8/2002 | Brandorff et al. | 5/86.1 |
| 6,440,046 | B1 | * | 8/2002 | Tholkes | 482/142 |
| 6,533,304 | B2 | * | 3/2003 | Lizama-Troncoso et al. | 280/250.1 |
| 6,539,562 | B1 | * | 4/2003 | Bianca | 5/86.1 |
| 6,619,681 | B2 | * | 9/2003 | Gutierrez | 280/250.1 |
| 6,738,999 | B1 | * | 5/2004 | Lingegård et al. | 5/81.1 R |
| 6,941,595 | B1 | * | 9/2005 | Michael | 5/83.1 |
| 7,568,712 | B2 | * | 8/2009 | Kovachi et al. | 280/87.021 |
| 8,104,835 | B2 | * | 1/2012 | Ovre et al. | 297/340 |
| 8,123,664 | B2 | * | 2/2012 | Lokken et al. | 482/142 |
| 8,156,581 | B2 | * | 4/2012 | Fogleman | 5/83.1 |
| 8,316,480 | B2 | * | 11/2012 | Burak et al. | 5/87.1 |
| 8,622,412 | B2 | * | 1/2014 | Pivato et al. | 280/304.1 |
| 2002/0140196 | A1 | * | 10/2002 | Crouch et al. | 280/87.051 |
| 2005/0156404 | A1 | * | 7/2005 | Lauren et al. | 280/304.1 |
| 2009/0158523 | A1 | * | 6/2009 | Burak et al. | 5/87.1 |
| 2010/0263697 | A1 | * | 10/2010 | Catton | 135/67 |

FOREIGN PATENT DOCUMENTS

| | | | | | |
|---|---|---|---|---|---|
| SE | WO 99/60977 | | | 12/1999 | |
| WO | WO 2004/052263 | | | 6/2004 | |
| WO | WO 2004052263 | A1 | * | 6/2004 | A61G 5/00 |

* cited by examiner

CHAIR WITH HEIGHT ADJUSTABLE MAST

RELATED APPLICATIONS

This application, as a U.S. national stage entry application under 35 U.S.C. §371 of international PCT patent application Ser. No. PCT/GB2010/001222 filed on Jun. 21, 2010, entitled "Chair with Height Adjustable Mast," claims priority and is entitled to the filing date of United Kingdom patent application Ser. No. 0910602.2 filed Jun. 19, 2009, and entitled "A Chair." The contents of the aforementioned applications are incorporated by reference herein.

INCORPORATION BY REFERENCE

Applicant(s) hereby incorporate herein by reference any and all U.S. patents and U.S. patent applications cited or referred to in this application.

BACKGROUND OF THE INVENTION

1. Field of the Invention

Aspects of the present invention relate to chairs, and more particularly to a chair suitable for use by disabled, frail and/or elderly persons.

2. Description of Related Art

A number of accessories, including hoists, toileting slings and wheelchairs are needed by disabled, frail and/or elderly persons in order to carry out routine tasks, such as moving a person from being seated on a chair for toileting and going to bed. However, these accessories tend to be unwieldy and physically demanding to use, and moreover, their use can be very uncomfortable for a person being moved.

Presently, there does not exist a chair suitable for use by disabled, frail and/or elderly persons having functionality adapted for carrying out such routine tasks with increased ease and minimal discomfort to a person using the chair. Accordingly, it is therefore an object of the present invention to provide a chair which goes at least someway towards alleviating the above problem and/or which will provide the public and/or industry with a useful alternative.

It is acknowledged that the term "comprise" may, under varying jurisdictions be provided with either an exclusive or inclusive meaning. For the purpose of this specification, and unless otherwise noted explicitly, the term comprise shall have an inclusive meaning—i.e., that it may be taken to mean an inclusion of not only the listed components it directly references, but also other non-specified components. This rationale should also be used when the terms "comprised" and/or "comprising" are used.

Further aspects of the present invention will become apparent form the ensuing description which is given by way of example only.

SUMMARY OF THE INVENTION

Aspects of the present invention teach certain benefits in construction and use which give rise to the exemplary advantages described below.

According to aspects of the invention, there is provided a chair comprising:

a chassis having a plurality of ground engaging wheels;

a back support frame; and a seat support comprising a rear seat section and a cradle;

whereby the back support frame comprises a height adjustable mast that is affixed at its lower end to the chassis, and a cross member that is connected to an upper end of the height adjustable mast and which extends substantially across the width of the chair.

Conveniently, the height adjustable mast is connected towards one side of the chassis so that the chair can be moved into close proximity of a bed whereby the chassis can be extend into the space below a bed such that the seat cradle can span across a mattress placed on the bed so that a patient can be placed onto said bed.

Ideally, the cross member is length adjustable so that the patent can be placed in the centre of the bed.

In one embodiment of the invention there is provided a hammock which extends from the back support frame onto the seat cushion and is coupled to fixing points of the seat support frame.

The present invention provides as a one piece of equipment a complete solution to problems associated with prior art chairs. It is provided in the form of a comfortable lounge chair which changes its function as the needs of a patient change.

In particular, the chair eliminates the discomfort of being hoisted and facilitates the removal of clothing without the patient rising from the seat. To enable clothing to be removed the rear portion of the seat rotates back and at the same time moves a cushioned support to the patient's back allowing access for the caregiver to remove clothing from the waist down while maintaining the patient's comfort. All this is achieved while the patient is in a seated position.

The centre base of the chair also drops down and the rear of the seat rotates into position allowing the patient to be toileted by pushing the chair over any toilet. This is made possible by the chair's height control functions. The hygiene requirements of the patient are also facilitated as the patient is at a comfortable height and in a suitable position to carry out all care needs. The patient can then be easily redressed and the chair returned to lounge mode.

The chair can also be used instead of a hoist to aid the patient when rising and going to bed. To assist the patient to and from the bed the chair has an integrated hammock which allows the resident to be positioned on the bed and the chair to be withdrawn leaving the hammock on the bed. The resident can then be easily moved on to their side to remove the hammock and reposition it on the chair.

Preferably, the hammock is coupled to fixing points of the back support frame, whereby actuation of a lever tensions the hammock.

In another embodiment, the back support frame and arm rest frame are together height adjustable on the main frame.

In another embodiment, the hammock comprises a toileting slot.

Preferably, the seat cushion comprises separate front and rear cushions, and the rear cushion is movable from under the toileting slot.

In another embodiment, the back support frame comprises a backrest and includes a lever to raise and lower the backrest.

In another embodiment of the invention, the chair further comprises a front support bracket which is adapted to be movable between a raised position in which it is retracted and a lowered position in which it forms a front standing platform of the chair.

In another embodiment, the rear seat section is pivotable away from under the hammock.

Preferably, the arm rest frame is pivotally connected to the back support frame.

Other aspects of the invention are defined in the appended claims which are incorporated into the description by way of reference, which aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention, in which:—

DETAILED DESCRIPTION OF THE INVENTION

Figure 1:
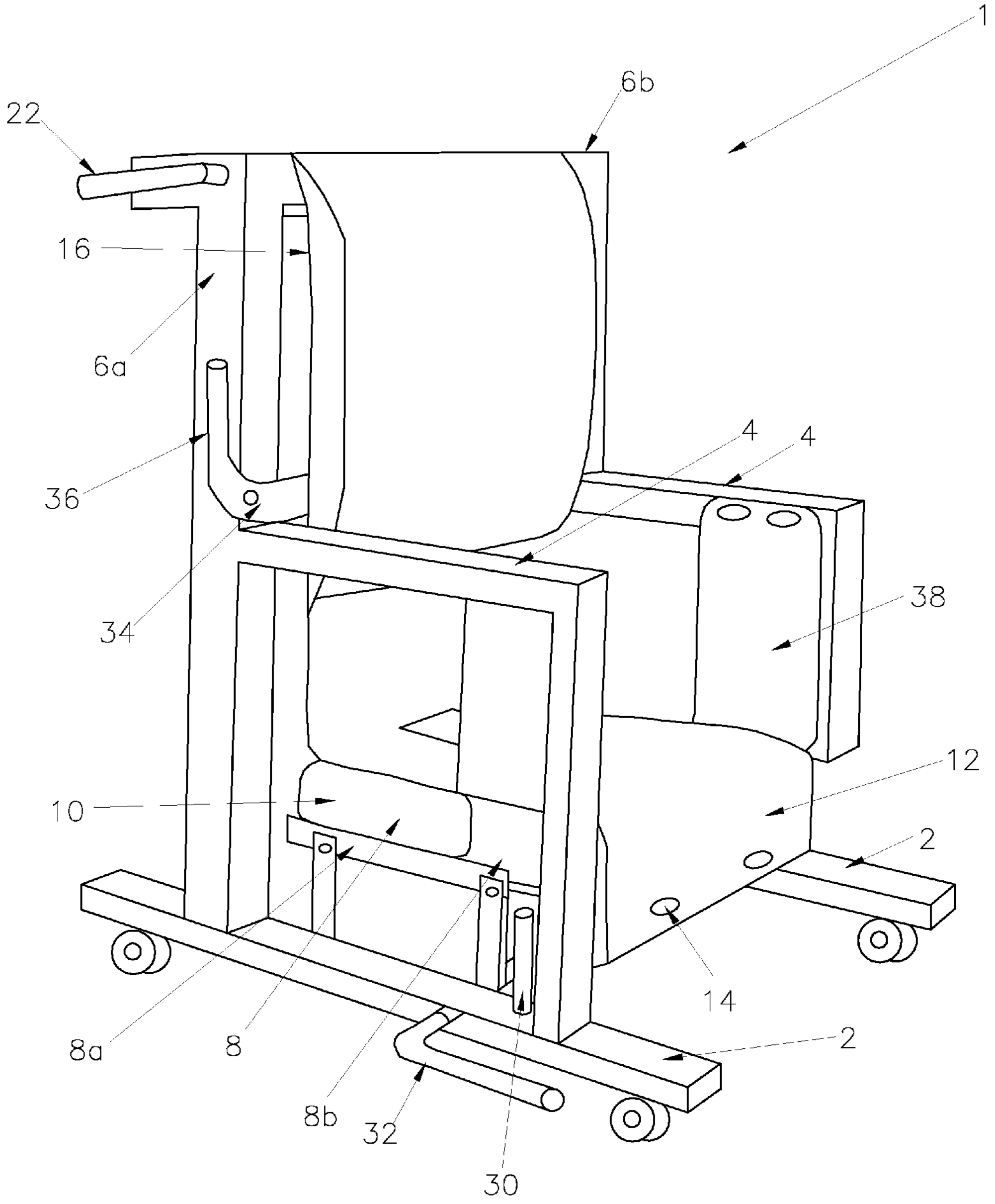
FIGS. 1 to 10 are perspective views of a chair configured according to one aspect of the present invention.
Figure 2:
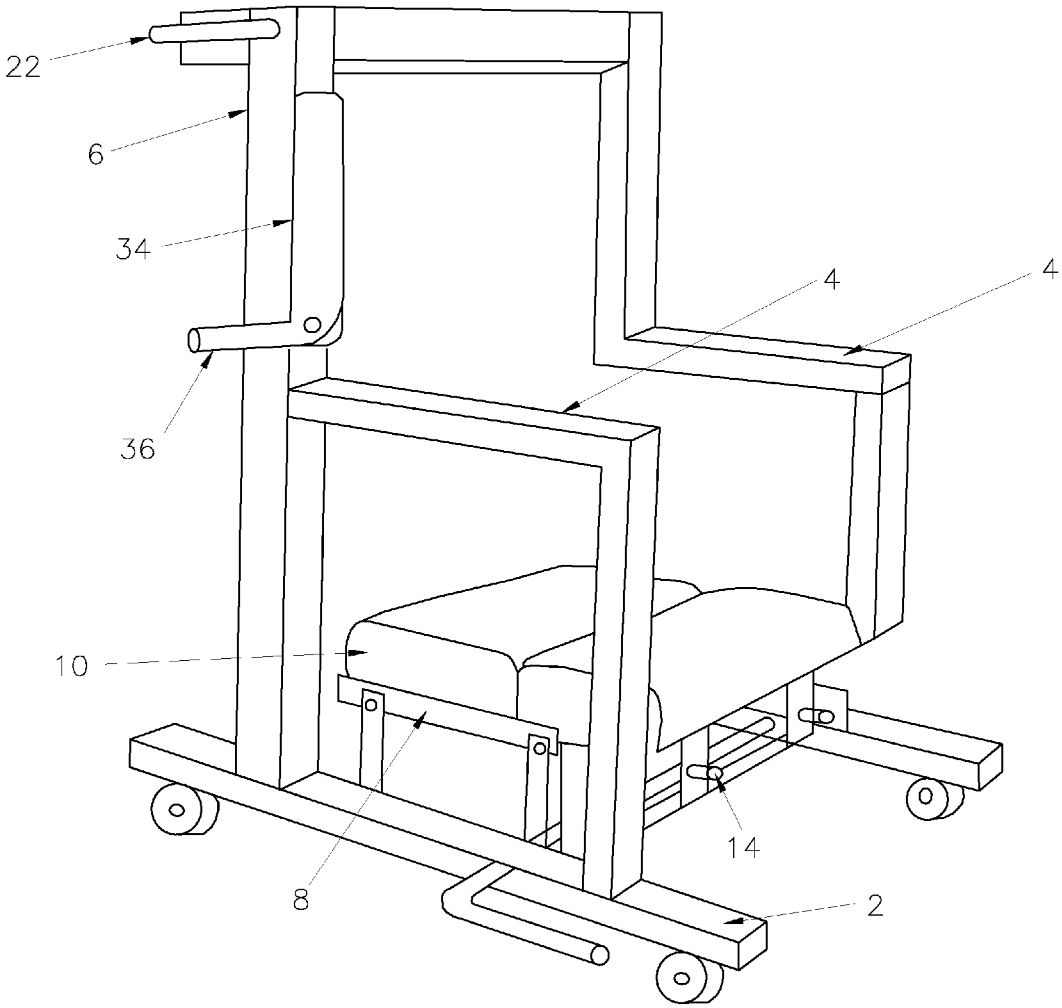
Figure 3:
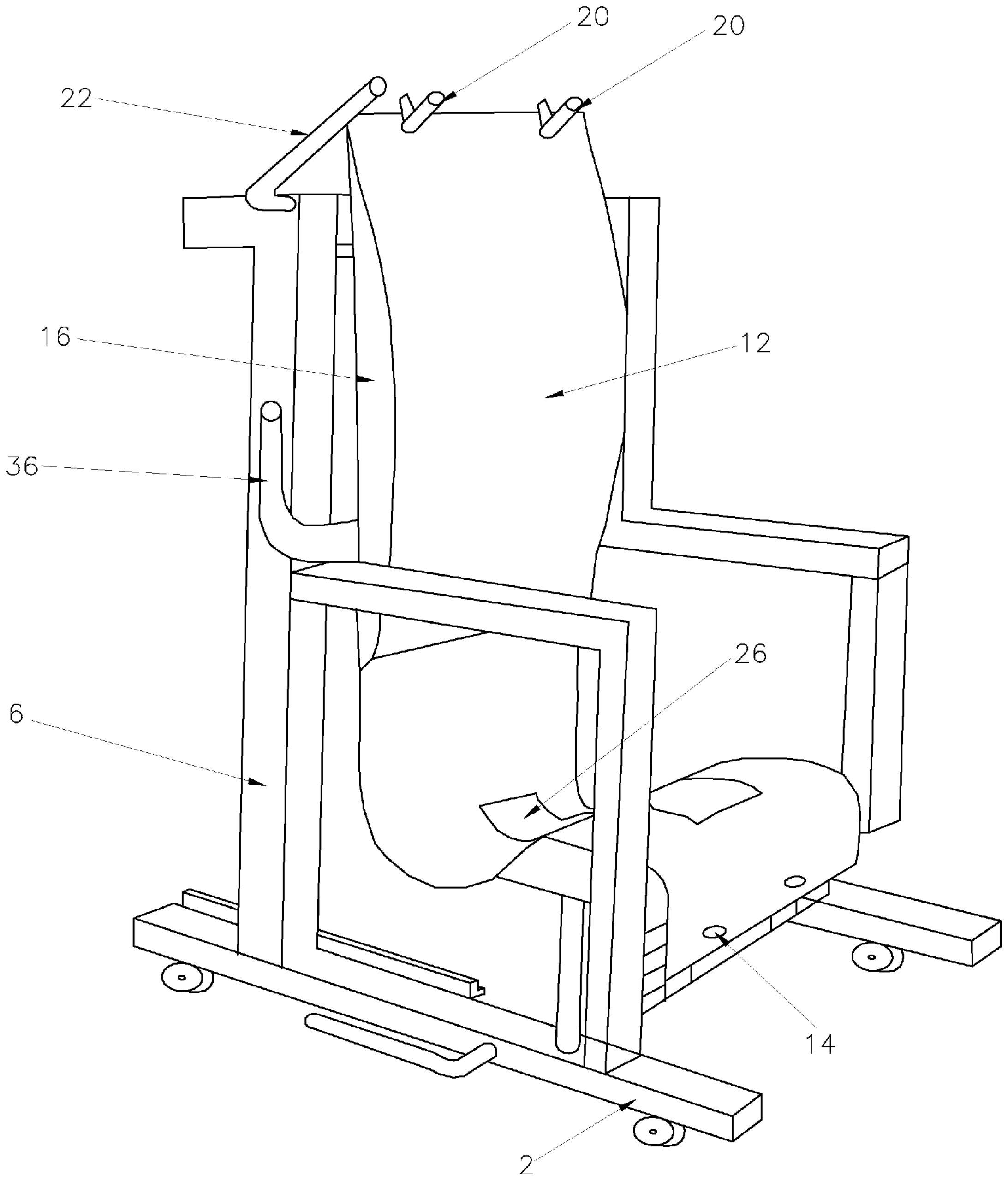
Figure 4:
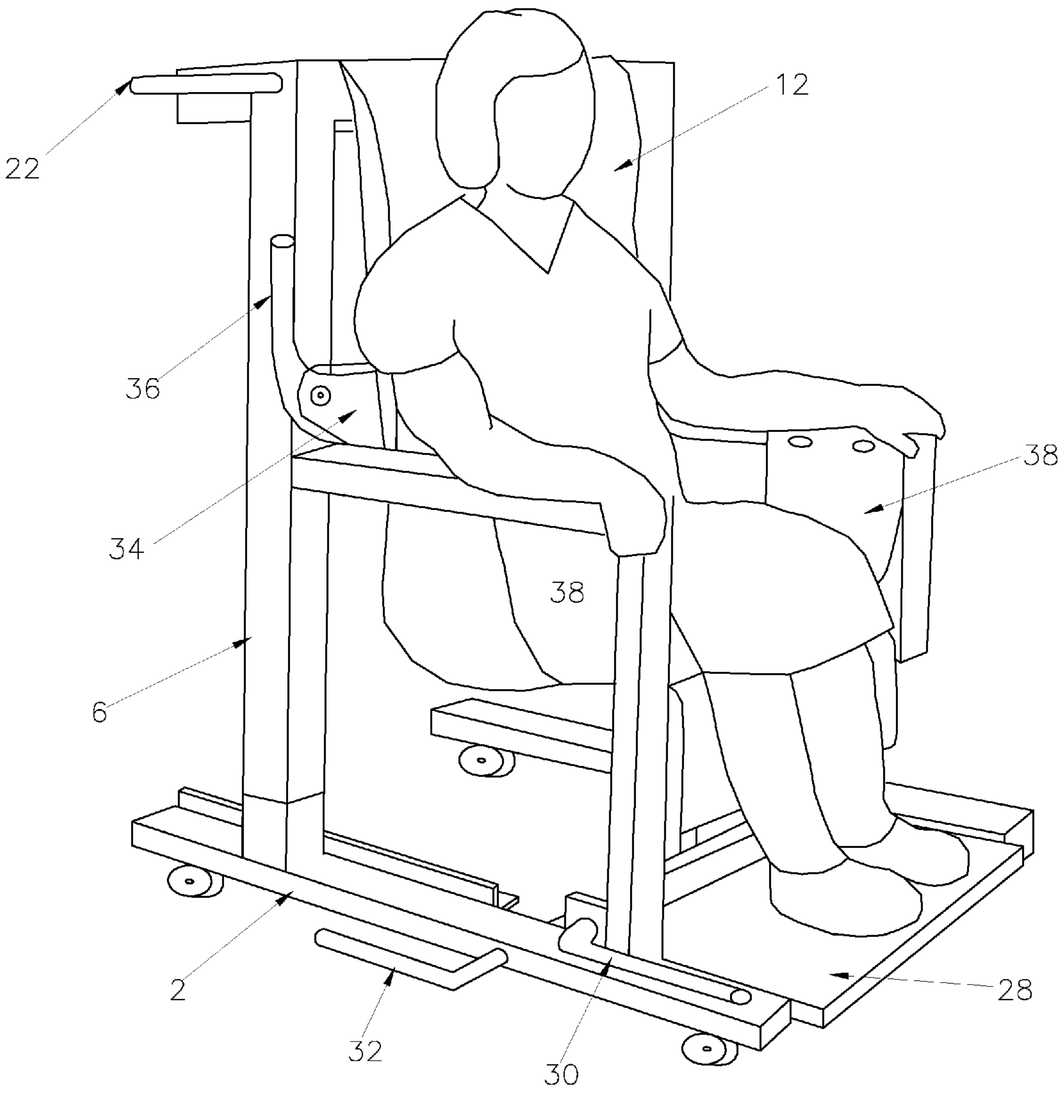
Figure 5:
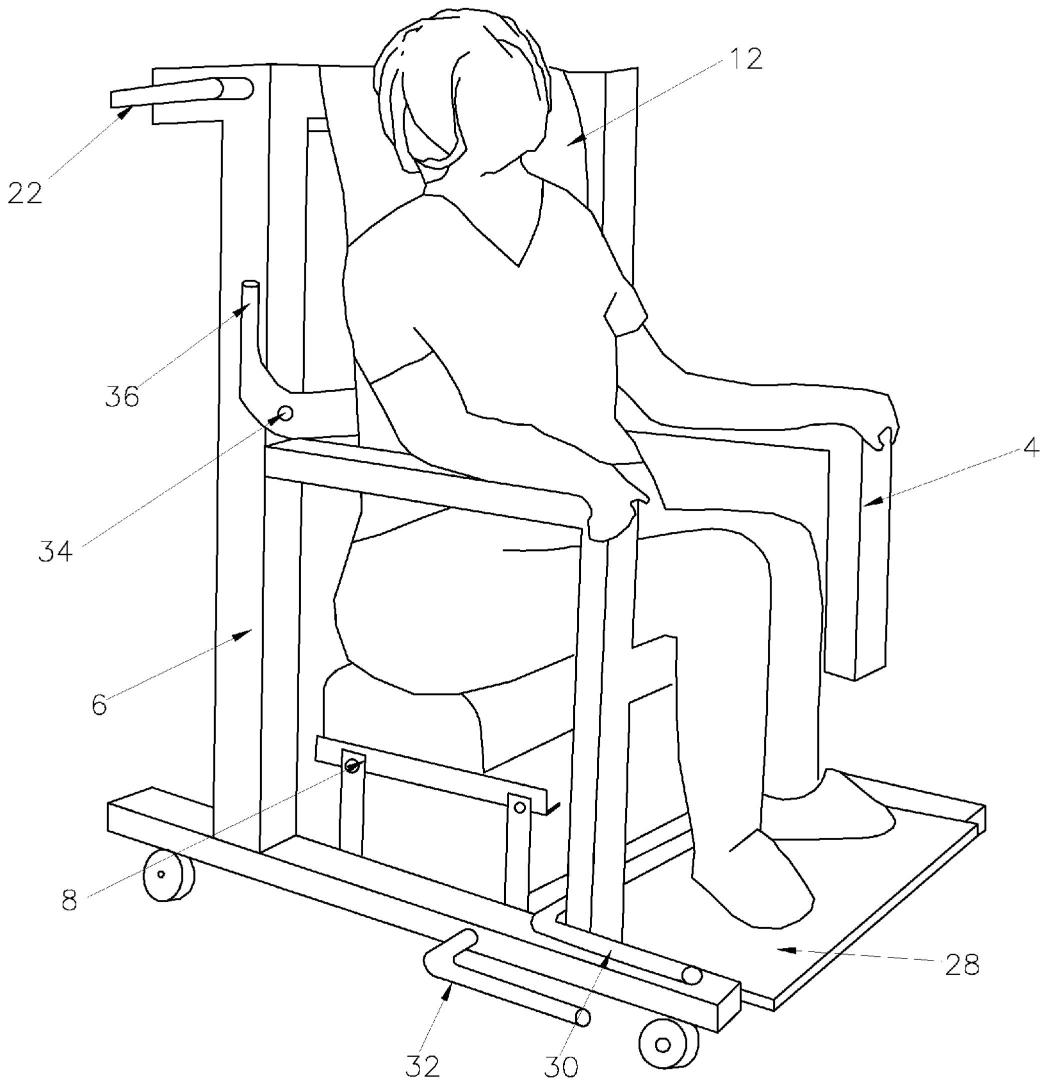

The invention will be more clearly understood from the following description of some embodiments thereof, given by way of example only, with reference to the accompanying drawings.

Referring to FIGS. 1 to 10, there is shown a chair, indicated generally by the reference numeral 1, comprising a chassis 2 having a plurality of ground engaging wheels, an arm rest frame 4, a back support frame 6, and a seat support frame 8 comprising a seat rear section 8*a* and a seat cradle 8*b*, each adapted to receive a seat cushion 10. A hammock 12 extends from the back support frame 6 and over the seat cushions 10. Hammock 12 is coupled at its bottom end to fixing points 14 of the seat support frame 8 and at its top end to fixing points 20 of the back support frame 6. Also shown, is an actuation lever 22 which is operable to rotate the fixing points 20 to tension the hammock 12 as required or as desired. Back support frame comprises height adjustable mast 6*a* which is affixed at its lower end to chassis 2, and a cross member 6*b* that is connected to an upper end of the height adjustable mast and which extends substantially across the width of the chair. The back support frame 6 further comprises a backrest 34 and includes a lever 36 to raise and lower the backrest 34 in order to provide back support. The height adjustable mast 6*a* is telescopically adjustable and is affixed to chassis 2 at one side of the chassis 2.

Figure 6:
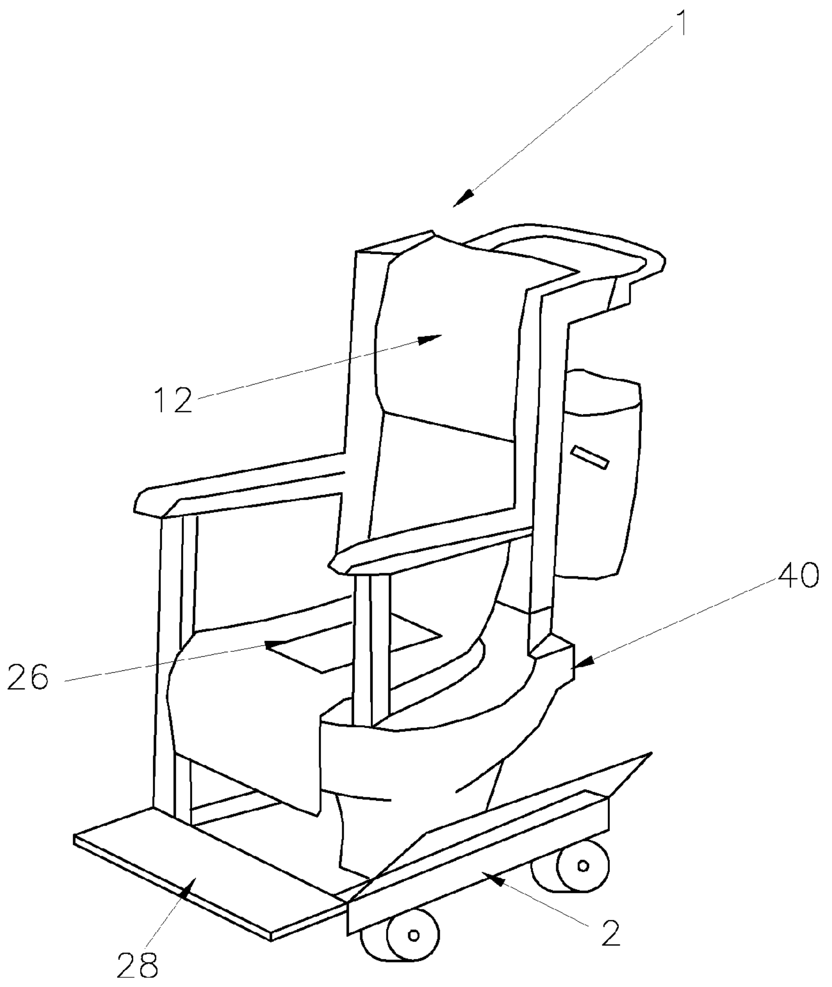
Figure 7:
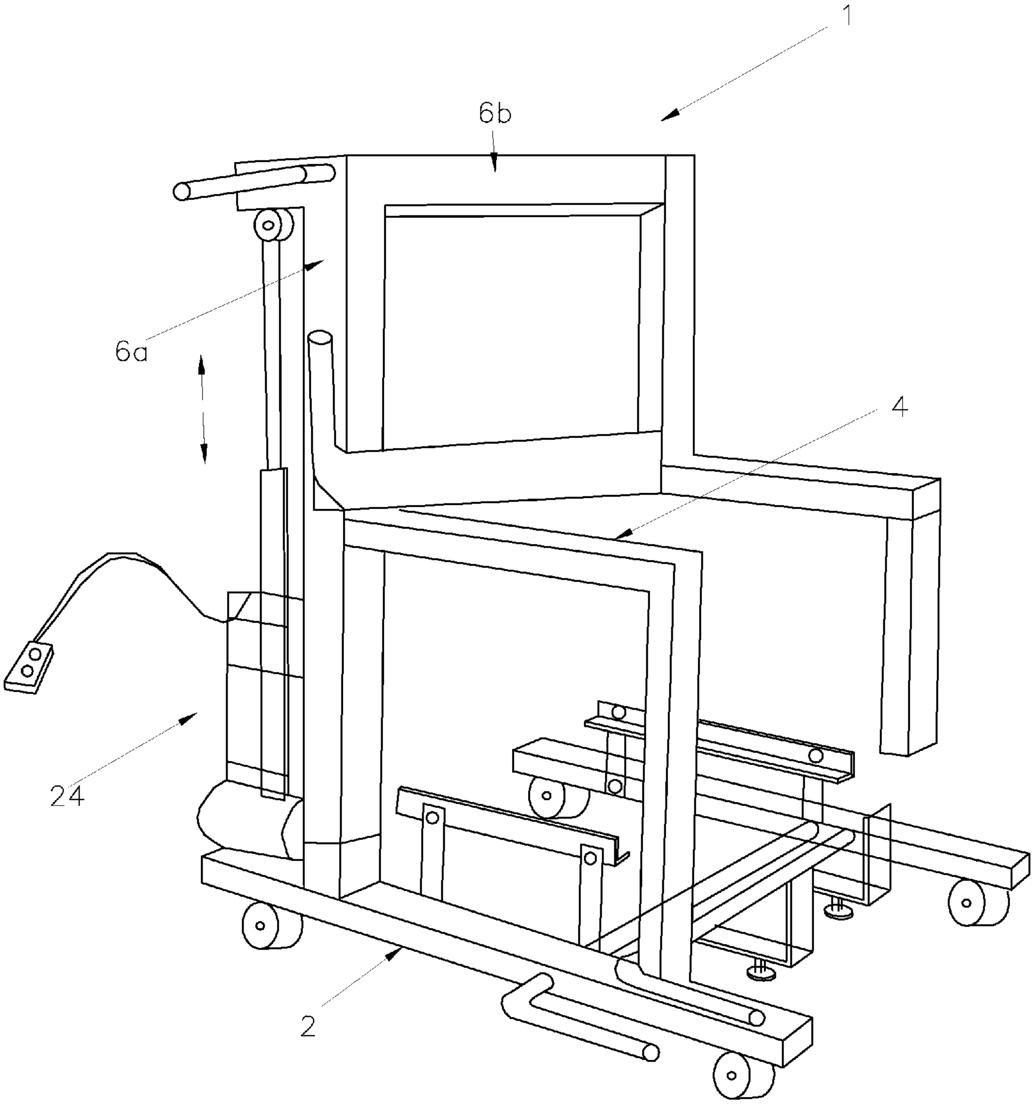
Figure 8:
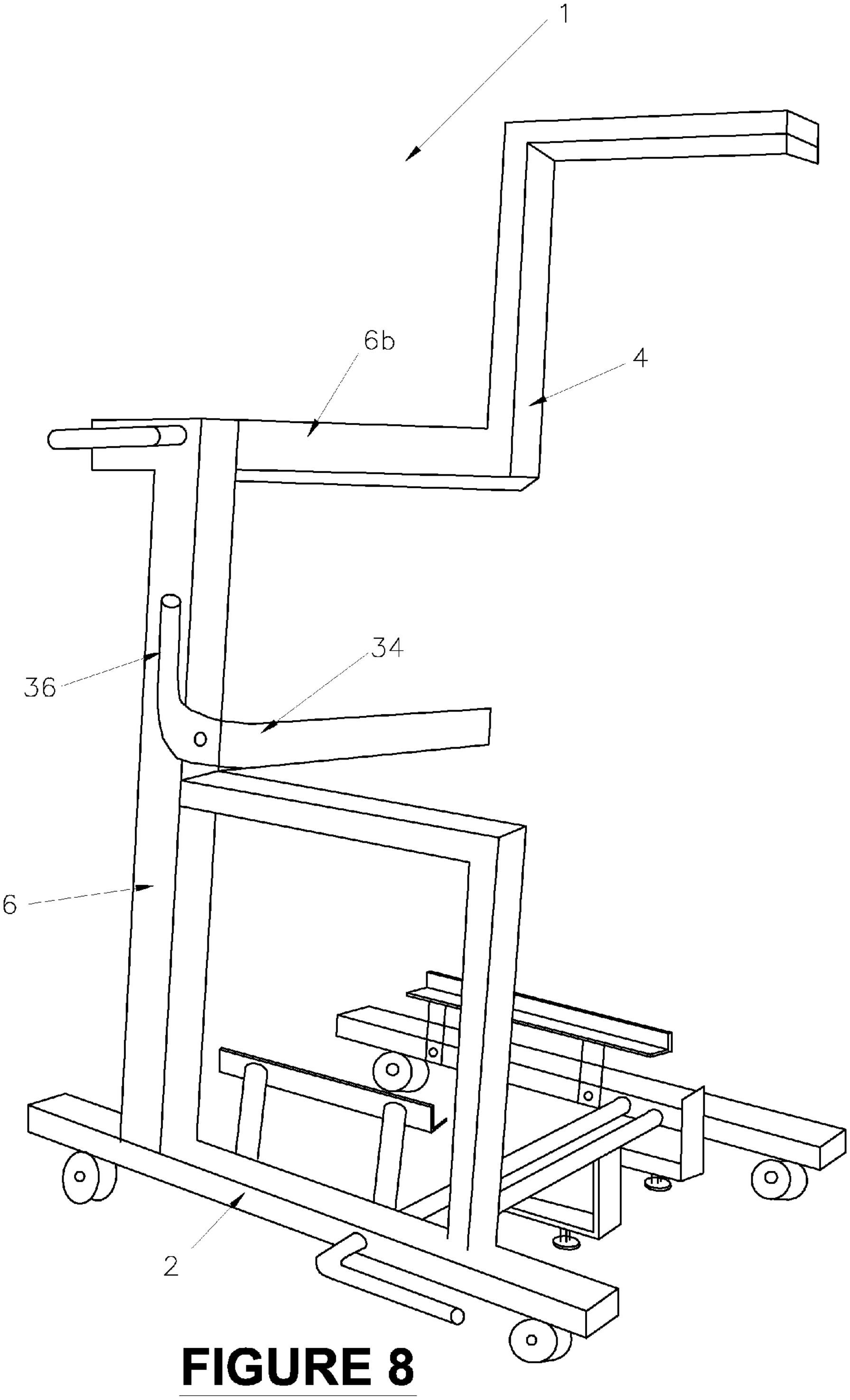
Figure 9:
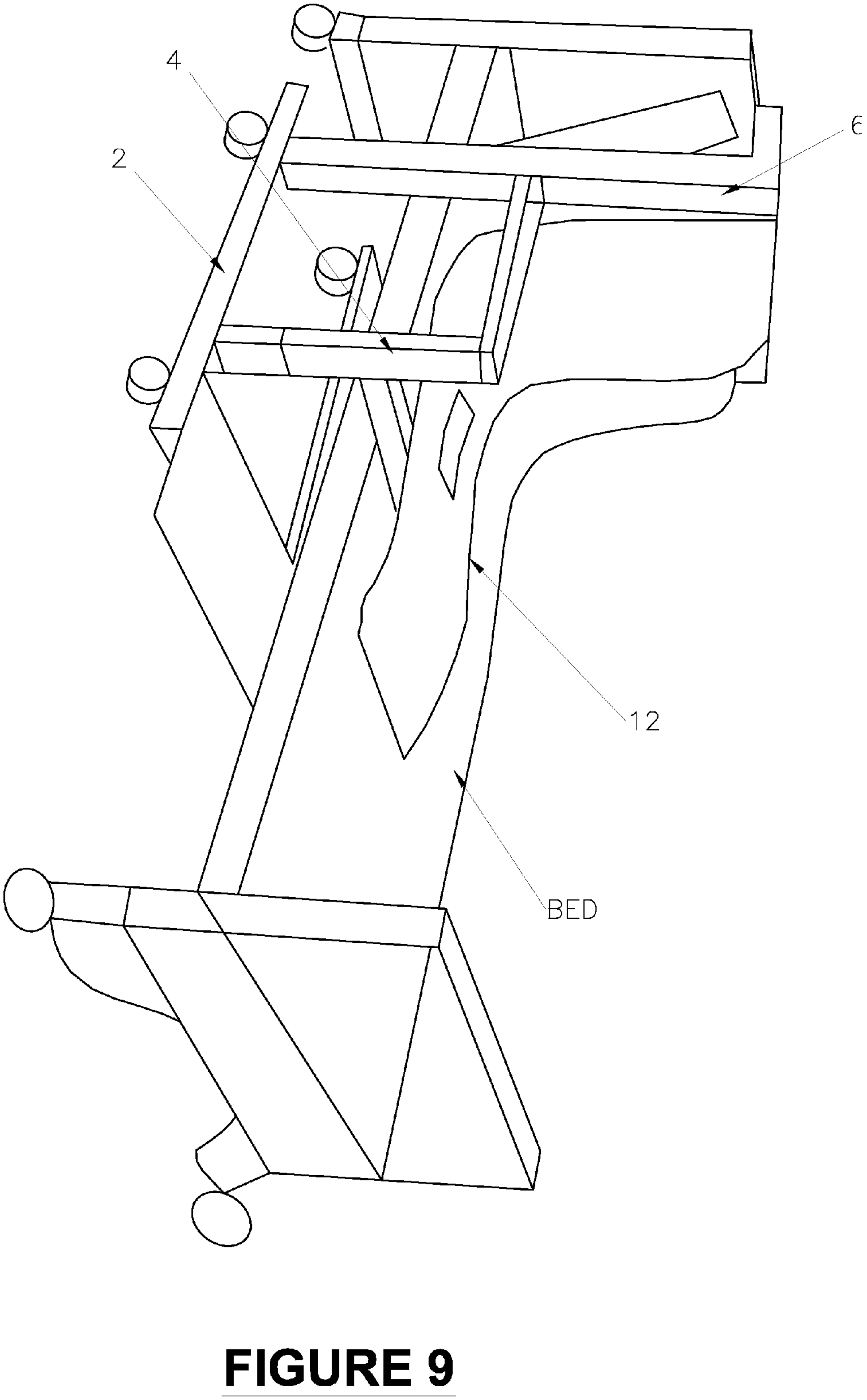
Figure 10:
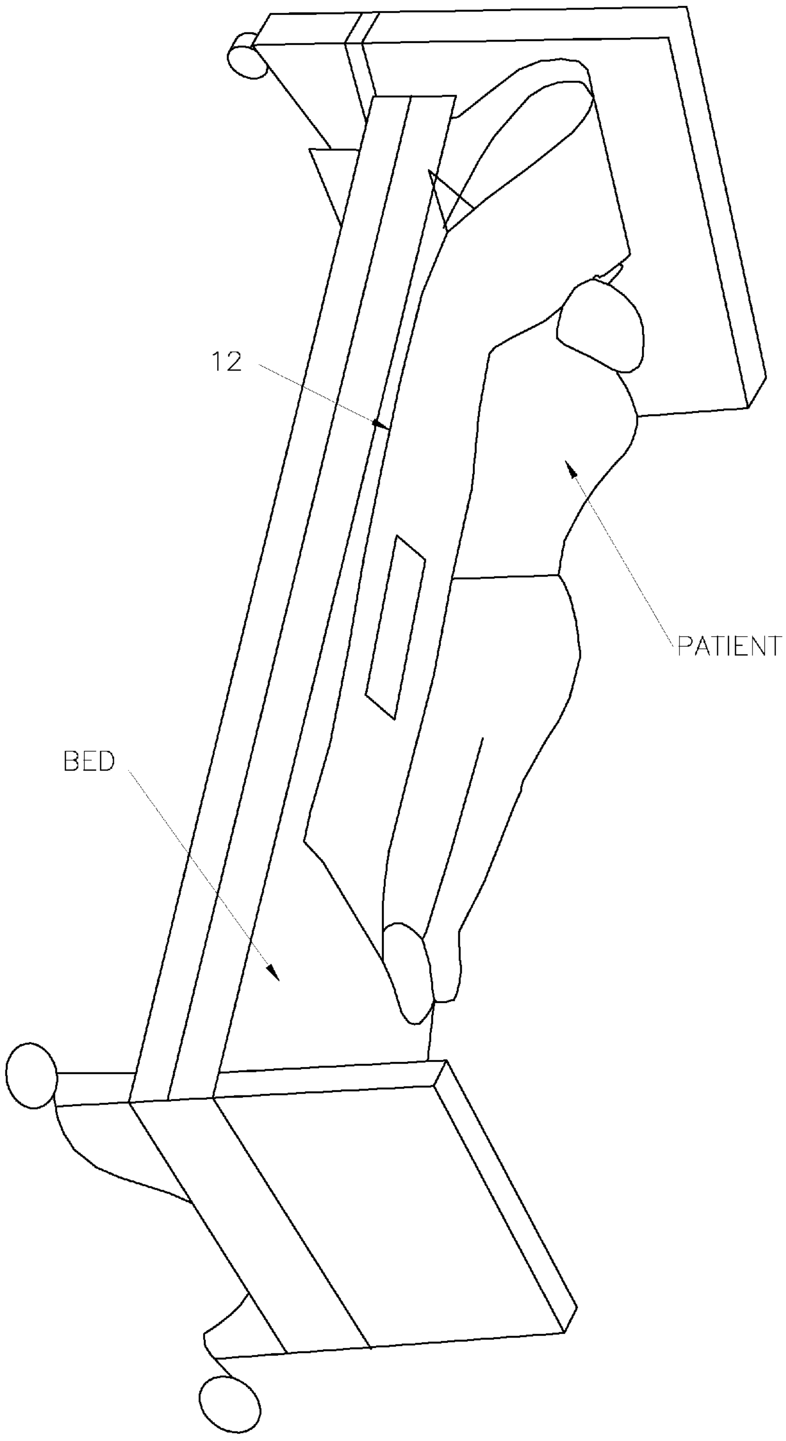

The back support frame 6 and the armrests 4 are together height adjustable on the main frame relative the chassis 2. The chair 1 comprises a powered means 24, such as a battery pack, together with means, such as a ram (not shown) for raising and lowering the mast 6*a* and thus arm rests 4 relative the chassis 2. This allows the area under the chair 1 to be positioned over a toilet 40, as shown in FIG. 6, or the hammock 12 and/or cradle 8*b* over a bed, as shown in FIG. 9.

In bedding mode, one arm rest 4, which is pivotally connected to the back support frame 6 cross member 6*b*, pivots upwardly so that the resident may be positioned whilst on the chair 1 over a bed mattress to enable comfortable positioning on the bed. Support straps 38 extend from the arm frames 4 and facilitate bedding mode by supporting the patient. The chair 1 may then be withdrawn leaving the hammock 12 on the bed. The resident can then be easily moved onto their side to remove the hammock 12 and reposition it on the chair 1.

To enable toilet usage whilst remaining seated in the chair 1 the hammock 12 also comprises a toileting slot 26. Additionally, the seat cushion 10 comprises separate front and rear cushions, and the rear cushion is movable from under the toileting slot 26. The seat support frame 8 is pivotable under the action of actuation lever 32 away from under the hammock 12 to facilitate toileting mode.

To enable clothing to be removed the rear cushion of the seat 10 rotates back and at the same time moves a cushioned support 16 to the patient's back allowing access for the caregiver to remove clothing from the waist down while maintaining the patient's comfort. All this is achieved while the patient is in a seated position. The chair 1 further comprises a front support bracket 28 which is adapted to be movable between a raised position in which it is retracted and a lowered configuration in which it forms a front standing platform of the chair 1. This further enables clothing to be removed. An actuation lever 30 is provided to raise and lower the front support bracket 28 to thereby raise the front cushion.

Figure 20B:
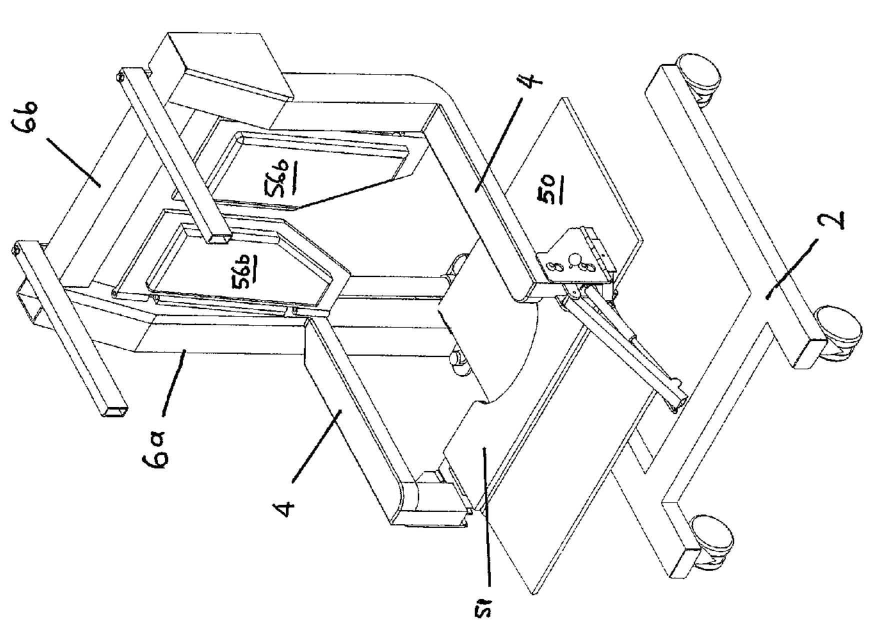
FIGS. 20*a* and 20*b* are perspective front views of a chair in accordance with aspects of the invention, the chair shown with an alternative seat back arrangement, the chair shown in a raised configuration.
Figure 20A:
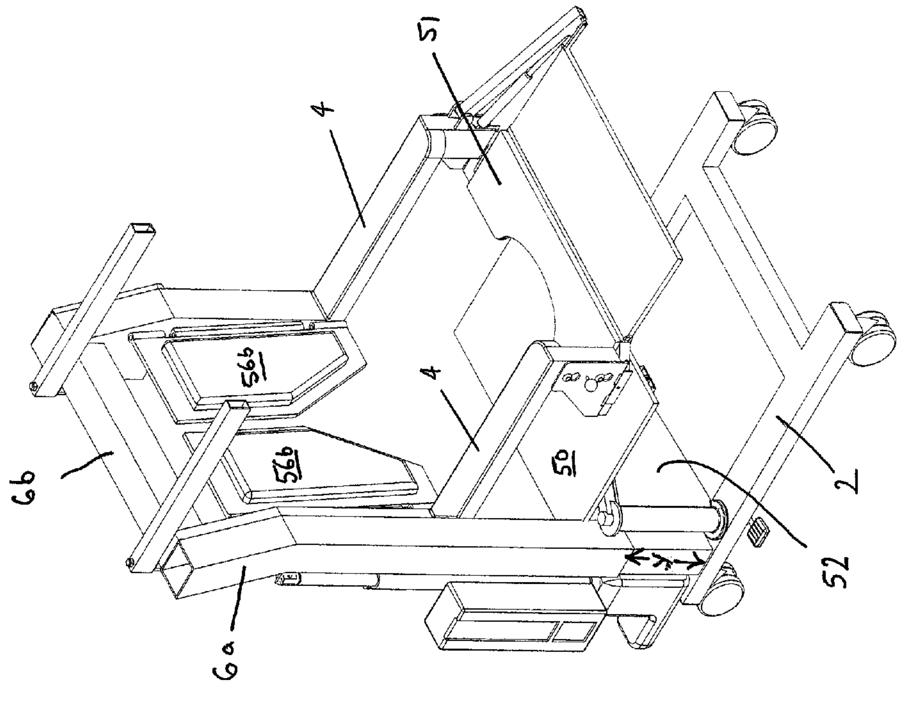

Referring to FIGS. 11*a*, 11*b*, 12*a*, 12*b*, 13*a* and 13*b*, the height adjustable mast 6*a*, which is affixed to one side of chassis 2, is shown in a lowered configuration. Mast 6*a* is telescopic with raising and lowering means in the form of a ram 6*c* being shown mounted externally of said mast 6*a*. Conveniently, ram 6*c* can alternatively be located within the mast. In FIGS. 14*a*, 15*a*, and 20*a* the upward extension of mast 6*a* relative chassis 2 is visible as is denoted by arrows 'Y'.

In a further embodiment of the invention, a cross member 6*b*, which extends substantially orthogonal from mast 6*a* is also telescopically extendable so that a patient seated in the chair can be moved further across a bed so that he or she may be deposited in the centre of a mattress placed thereon. To enable this telescopic extension a ram is provided within cross member 6*b*. Extension of cross member 6*b* relative mast 6*a* is shown in FIGS. 14*a*, 14*b*, 16*a*, 16*b* and 21*b* and is denoted by arrows 'X'. It is envisaged that an extension of 200 mm is sufficient to place a patient in the centre of a standard single bed or at a safe position away from the edge of a standard double bed.

Power and control over the height adjustment of mast 6*a* and cross member 6*b* is provided by a battery pack 40 and control interface 41 which are mounted to the chair. Control interface 41 may also be provided in the form of a detachable hand-held remote control unit.

Figure 11B:
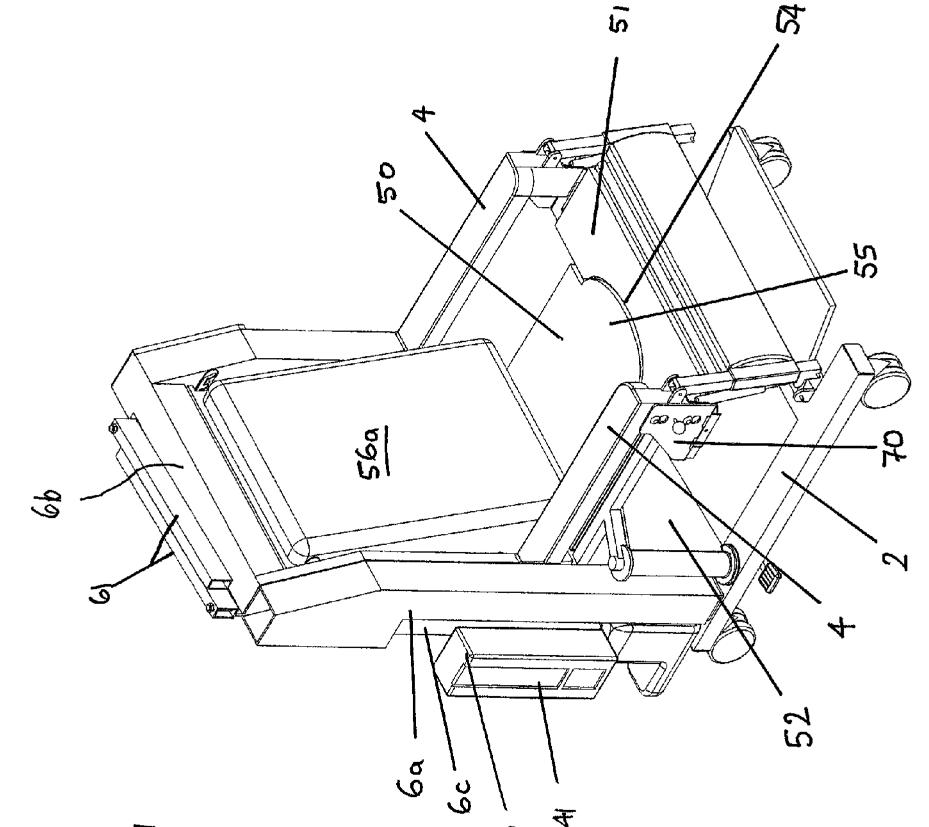
FIGS. 11*a* and 11*b* are perspective front views of a chair in accordance with aspects of the invention, the chair shown in a lowered configuration.
Figure 11A:
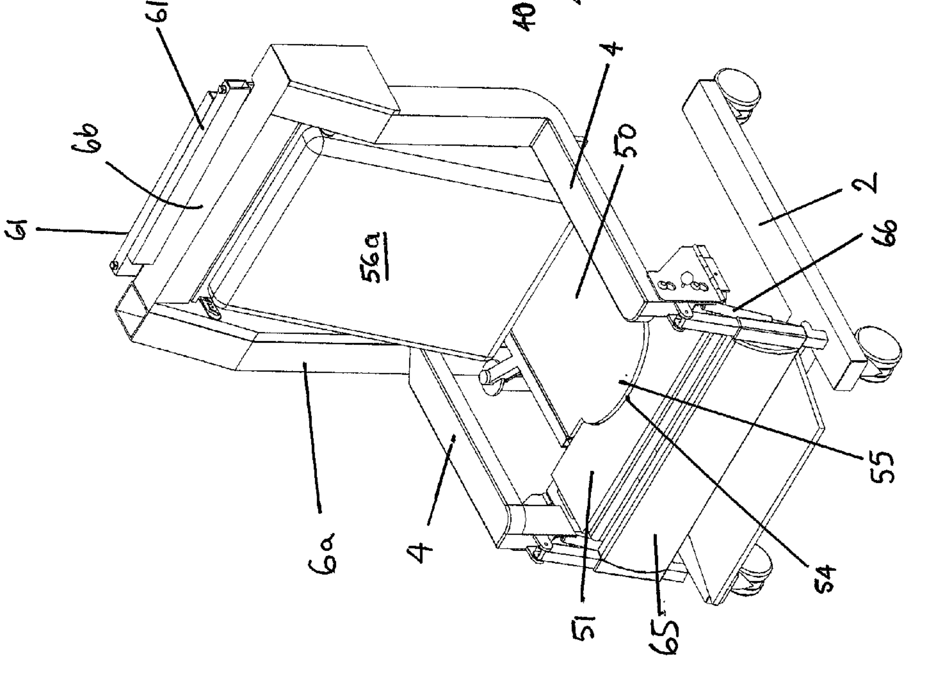
Figure 12B:
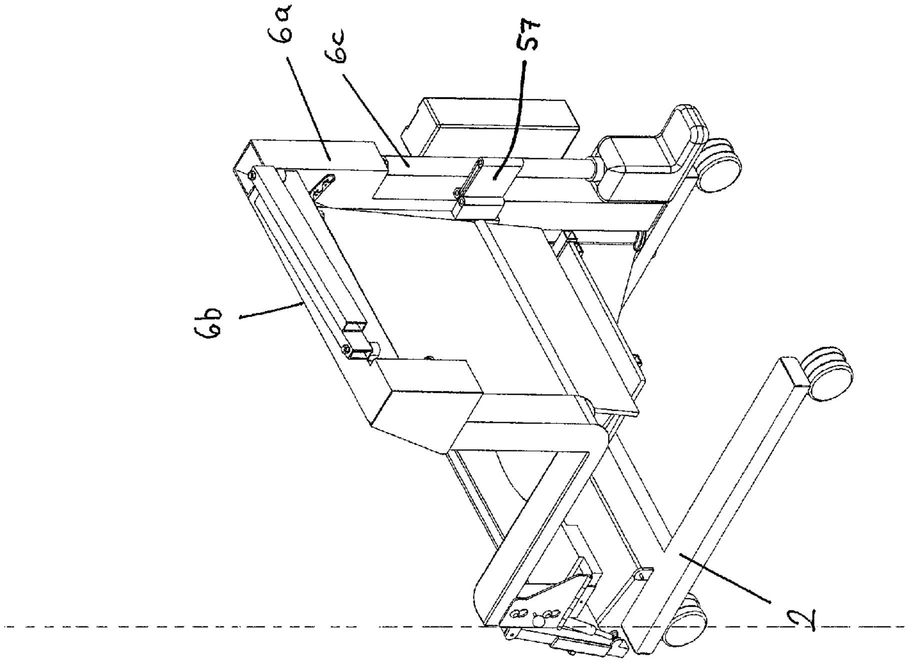
FIGS. 12*a* and 12*b* are perspective rear views of the chair of FIGS. 11*a* and 11*b;*
Figure 12A:
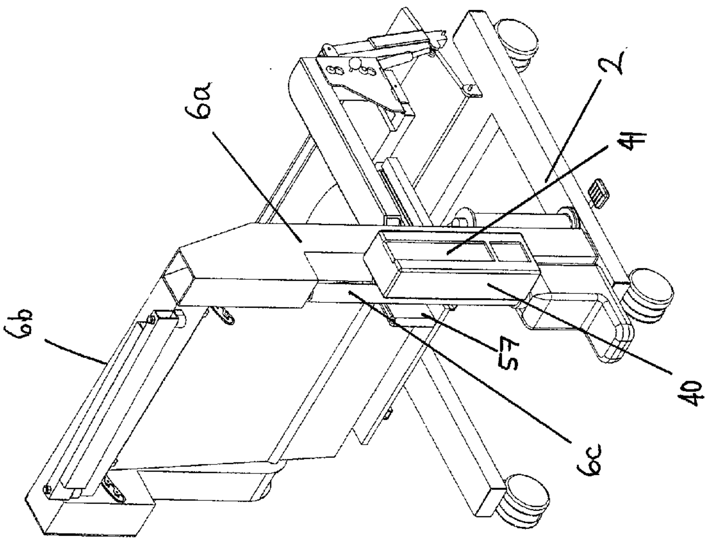
Figure 13B:
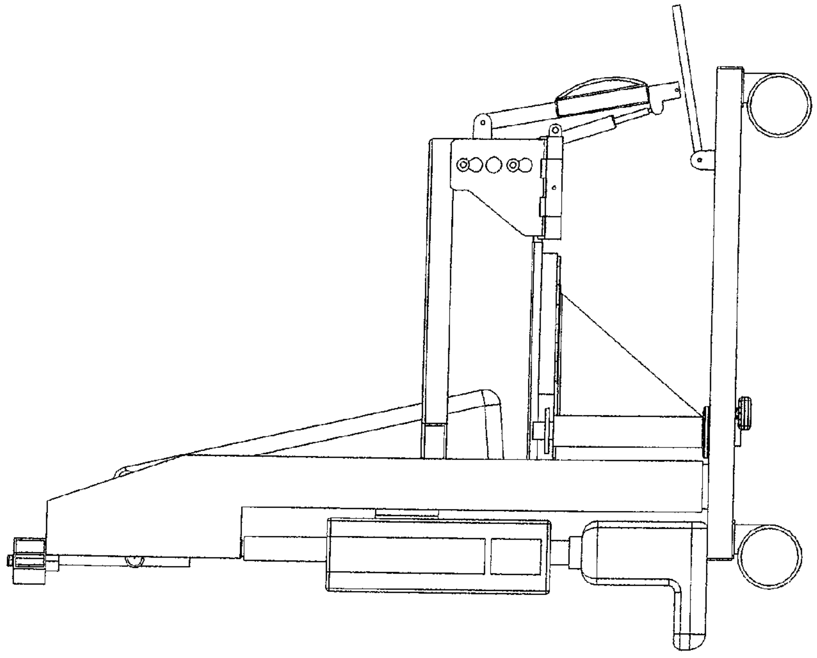
FIGS. 13*a* and 13*b* are side elevations of the chair of FIGS. 11*a* and 11*b*, the chair shown in a lowered configuration.
Figure 13A:
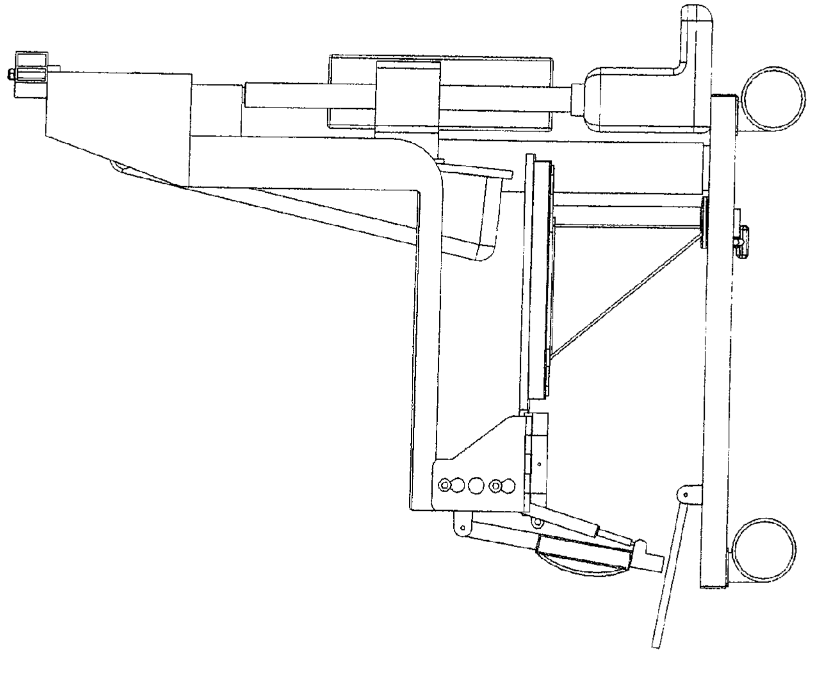

Referring to FIGS. 11*a*, 11*b*, 20*a* and 20*b*, the seated area of the chair comprises a seat rear section 50, a seat cradle 51 and a seat back 56. Seat rear section 50 is not connected to the back mast 6*a* but is independently mounted to the chassis 2. Seat cradle 51 extends between arm rests 4 and is adapted to engage with the undersides of a patient's thighs as they sit in the chair. As seat cradle 51 is connected to the height adjustable mast via arm rests 4 which are connected to cross member 6*b*, seat cradle 51 can be raised or lowered independently of rear seat section 50 so that a patient, supported on a harness 60 (FIGS. 14*c* and 14*d*), can be raised in a seated position away from the seat rear section 50 which can then in turn be rotated away from below. In this way a toileting mode is facilitated whereby the chair can be moved over a toilet as shown in FIGS. 14*c* and 14*d*. Conveniently, this ability to raise a patient from the seat rear section 50 helps relieve the discomfort associated with prolonged periods of sitting. As shown in FIGS. 11*a* and 11*b* seat cradle 51 is provided with an arcuate cut out portion 54 which corresponds substantially with the curvature of the front of a toilet bowl. Rear seat section 50 is provided with a complementary arcuate tongue 55 which fills the space defined by the arcuate cut out portion 54 when the chair is in a lowered position as shown in FIGS. 11*a* and 11*b*.

Figure 14B:
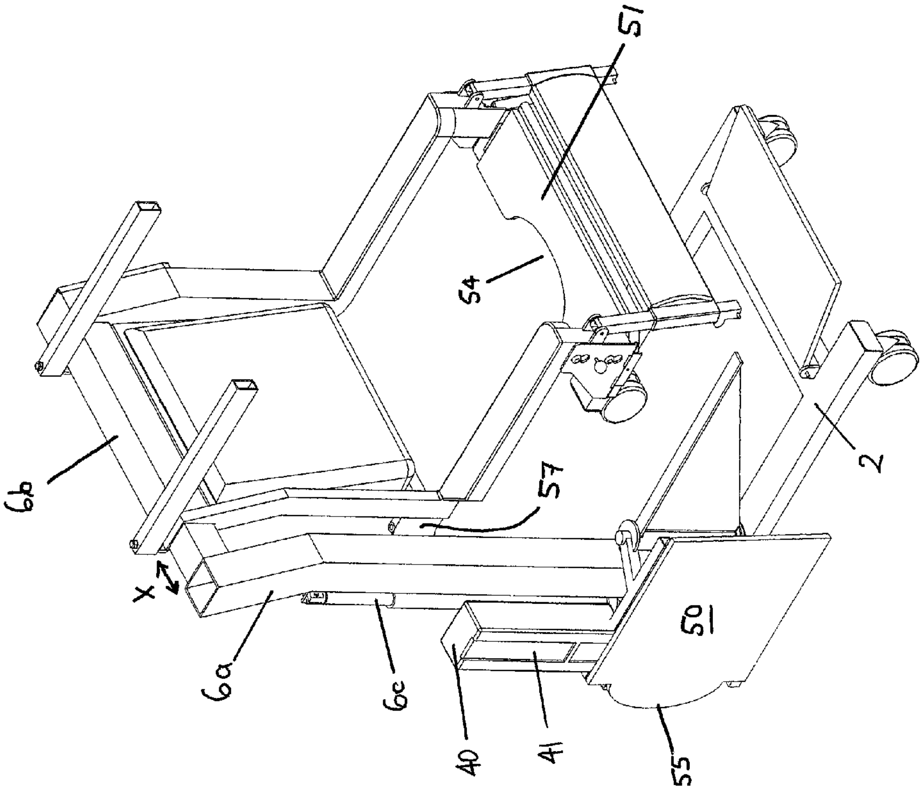
FIGS. 14*a* and 14*b* are perspective from views of the chair of FIGS. 11*a* and 11*b*, the chair shown in a raised and extended configuration.
Figure 14A:
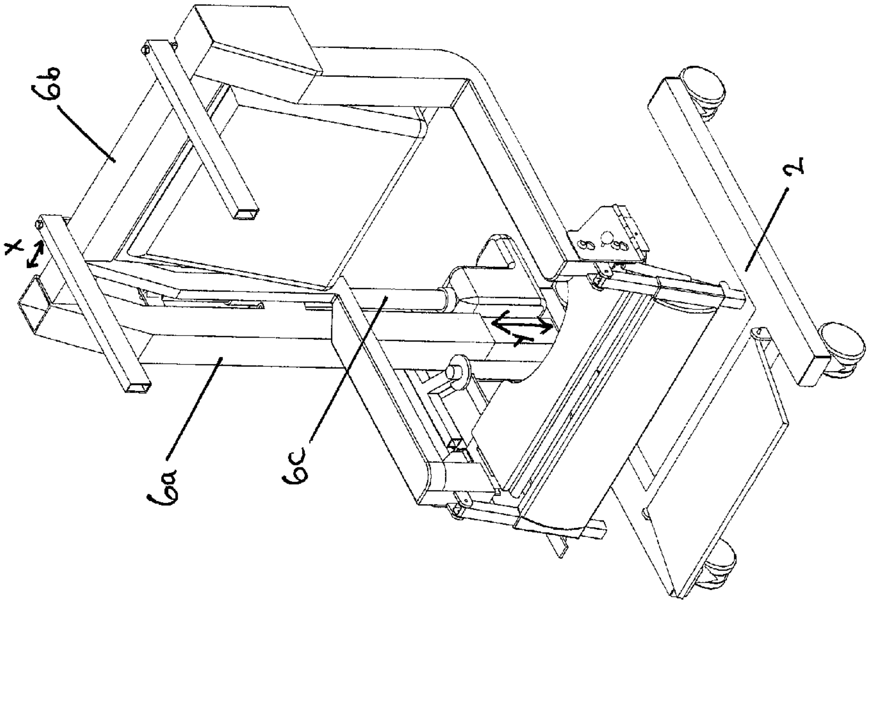
Figure 14C:
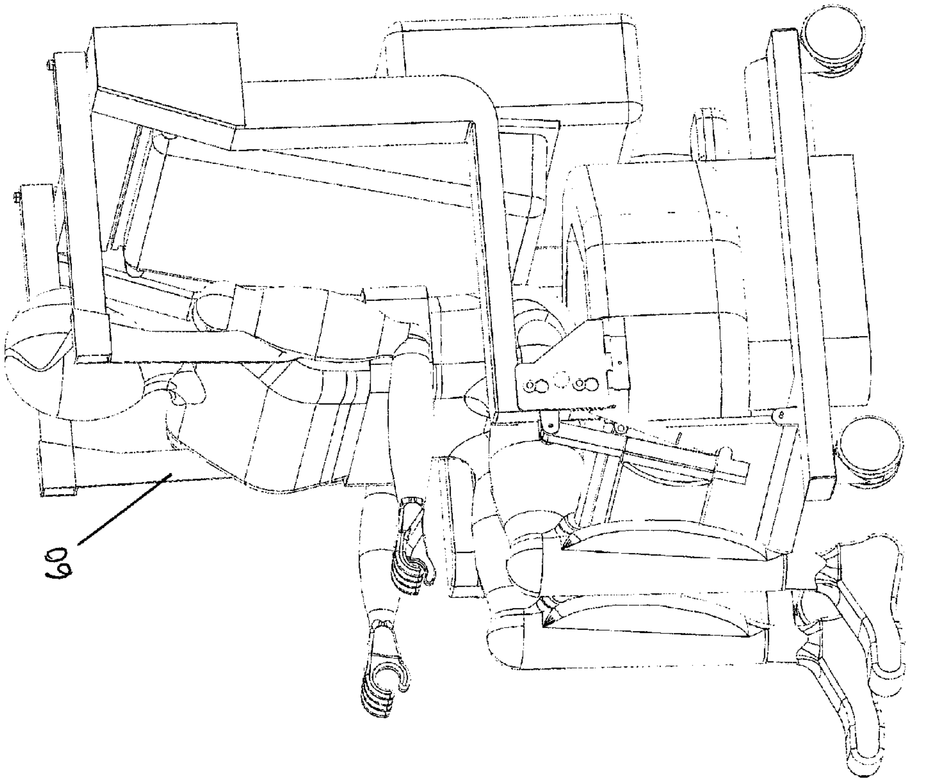
FIGS. 14*c* and 14*d* are perspective views of the chair of FIGS. 11*a* and 11*b*, the chair shown in a raised configuration and positioned over a toilet.
Figure 14D:
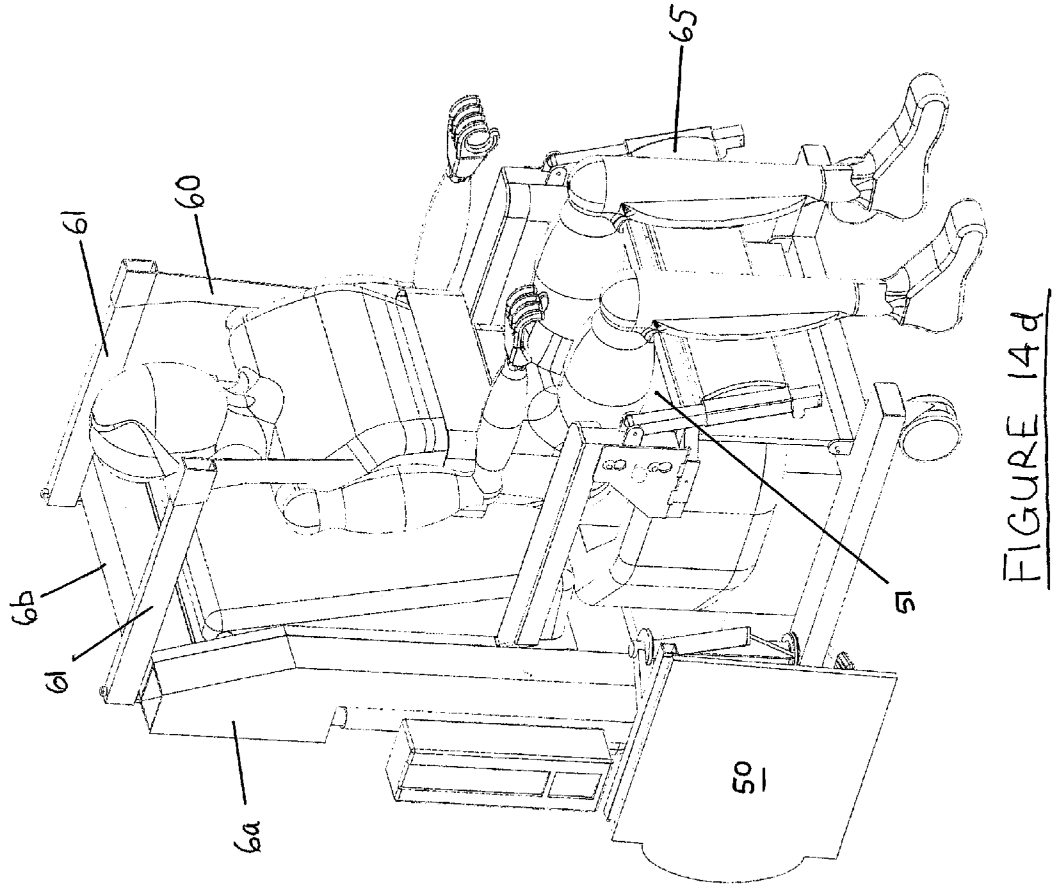
Figure 15B:
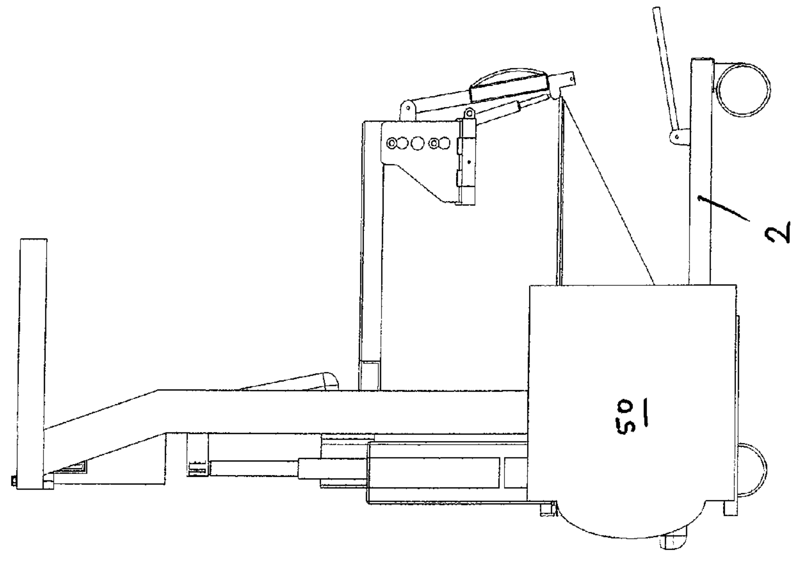
FIGS. 15*a* and 15*b* are side elevations of the chair of FIGS. 14*a* and 14*b*, the chair shown in a raised and extended configuration.
Figure 15A:
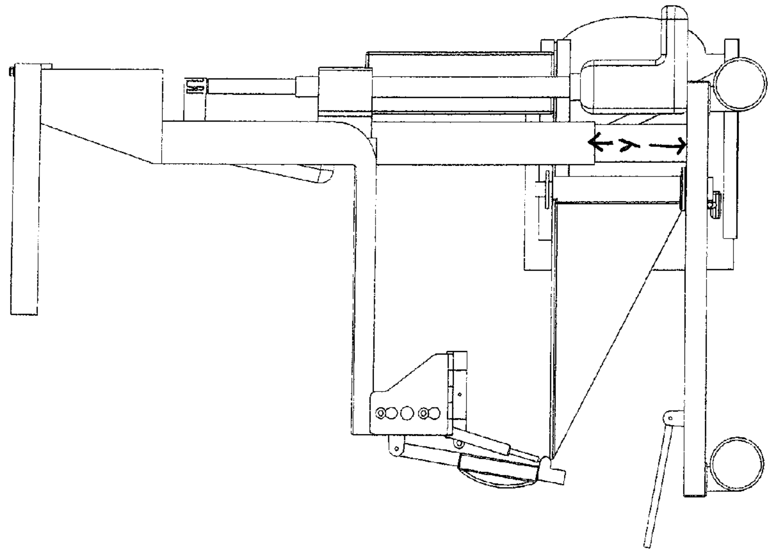
Figure 16B:
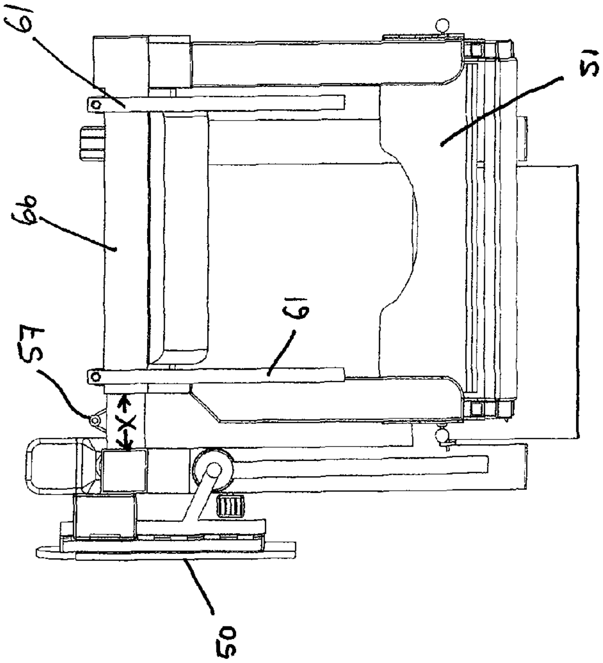
FIGS. 16*a* and 16*b* are rear elevation and plan views, respectively, of the chair of FIGS. 11*a* and 11*b*, the chair shown in a raised and extended configuration.
Figure 16A:
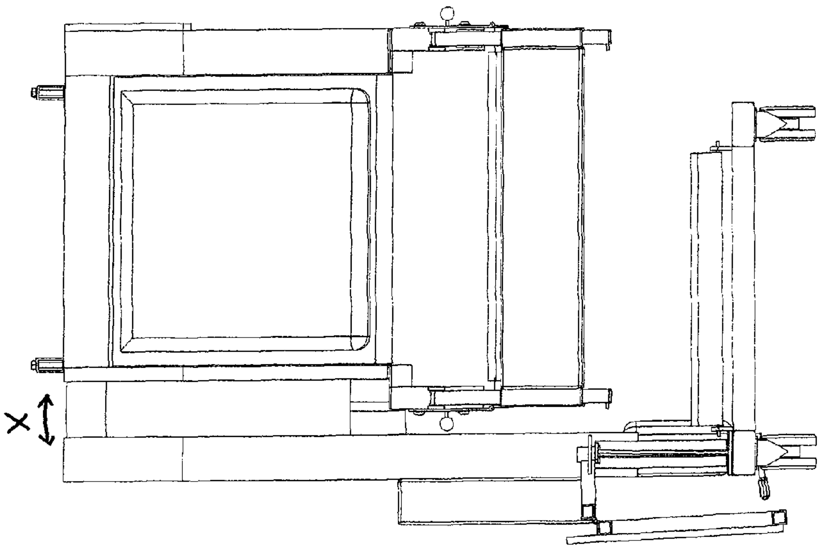
Figure 19:
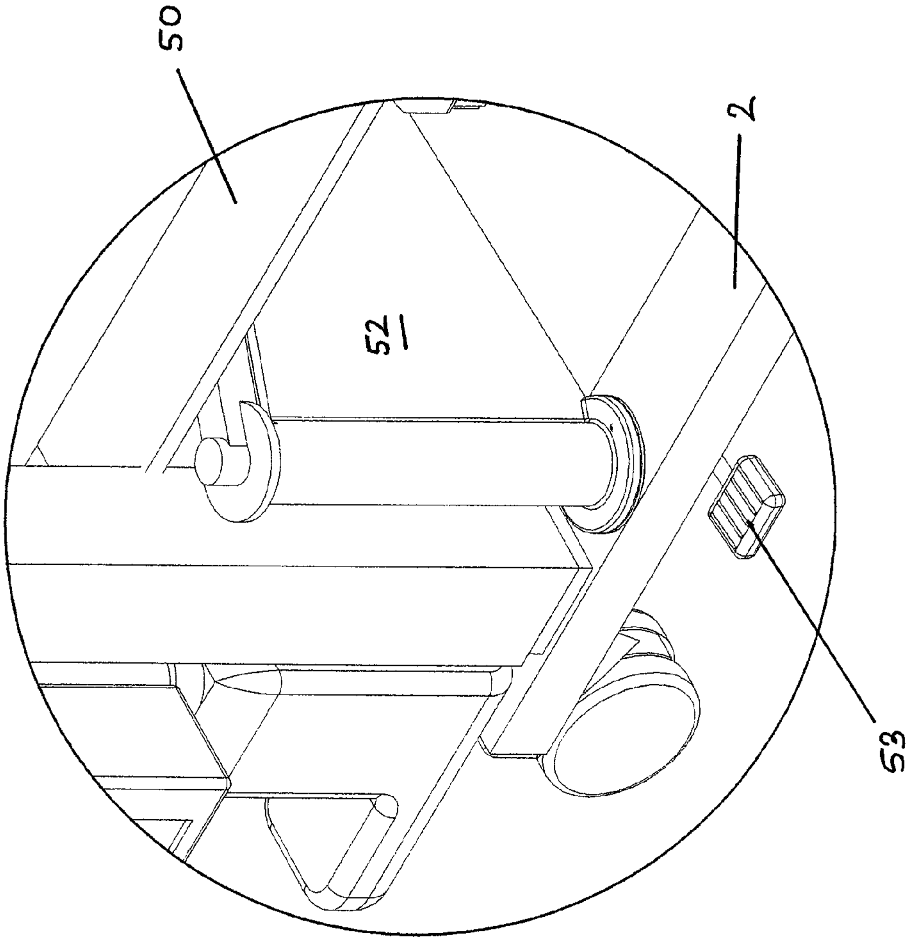
FIG. 19 is a detailed view of a rotatable seat support mechanism in accordance with aspects of the invention.

As shown in FIGS. 14*b*, 15*b* and 16*b*, when rotated from beneath the chair to enable the chair to be placed over a toilet or in proximity to a bed, rear seat section 50 can be neatly folded substantially flush against the side of chassis 2 thereby minimising the footprint of the chair. In FIG. 14*b* a pivoting seat support 52 which supports the underside of seat rear section 50 is also provided. Seat support 52 is pivotally mounted to chassis 2 so that it is rotatably movable with seat rear section 50 away from the chair. As seat rear section 50 is returned from a folded position as shown in FIGS. 14*b* and 15*b* to a normal in use position as shown in FIGS. 11*b* and 20*a*, seat rear section 50 collects seat support 52 by means of a cam mechanism (not shown) so that it is moved into a supporting position substantially diagonally across the underside of said seat rear section. FIG. 19 shows in detail the rotatable mounting mechanism of seat rear support 50. Rotation of seat rear section 50 and seat support 52 may be effected by spring means (not shown) which is activated by a foot pedal 53 as illustrated in FIG. 19.

Figure 17B:
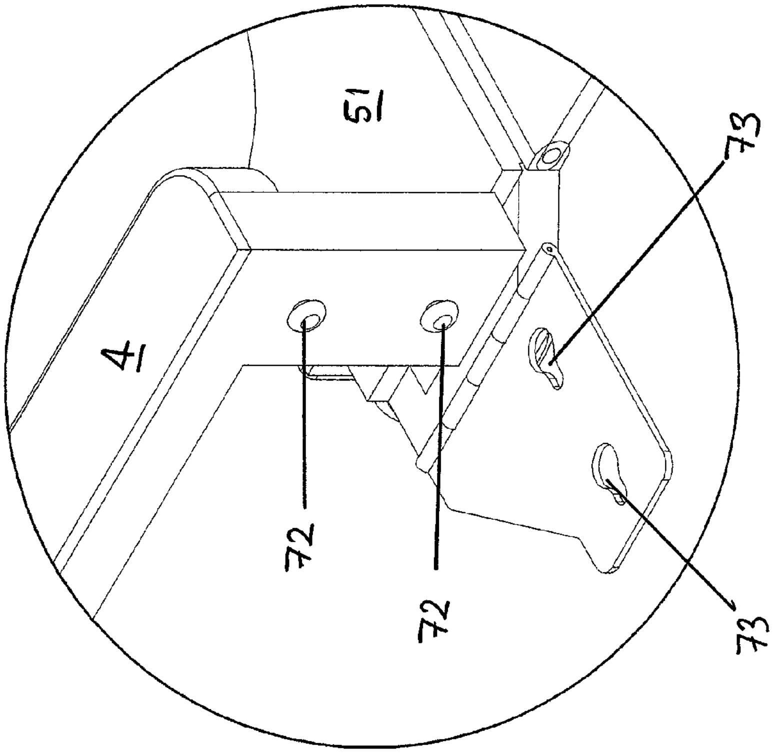
FIGS. 17*a* and 17*b* are detailed views of a seat cradle release mechanism in accordance with aspects of the invention.
Figure 17A:
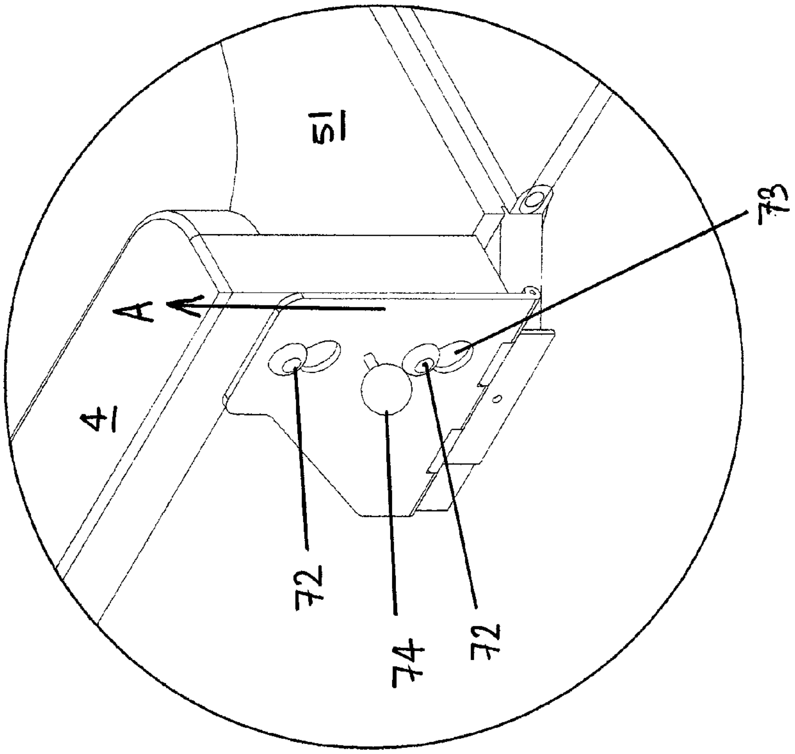
Figure 21B:
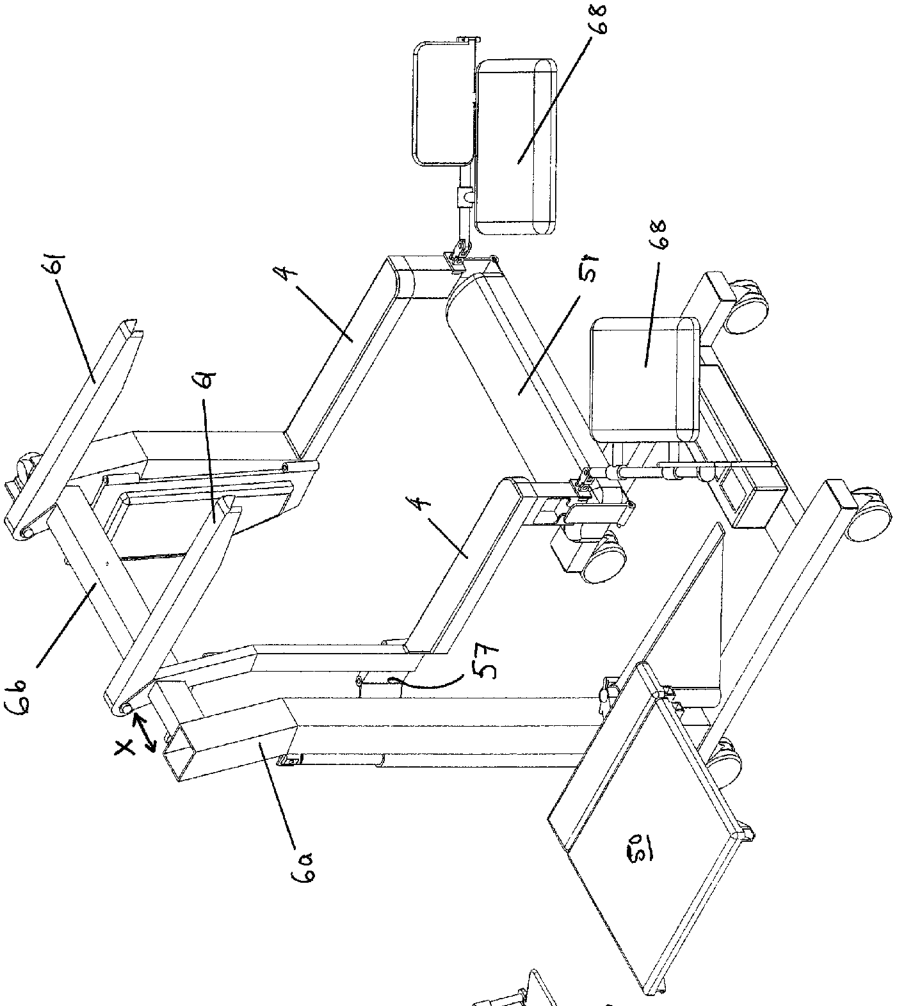
FIGS. 21*a* and 21*b* are perspective front views of the chair with an alternative seat back arrangement, the chair shown with an alternative leg support arrangement in accordance with aspects of the invention, the chair shown in a raised configuration (FIG. 21*a*) and in a raised and extended configuration (FIG. 21*b*), respectively.
Figure 21A:
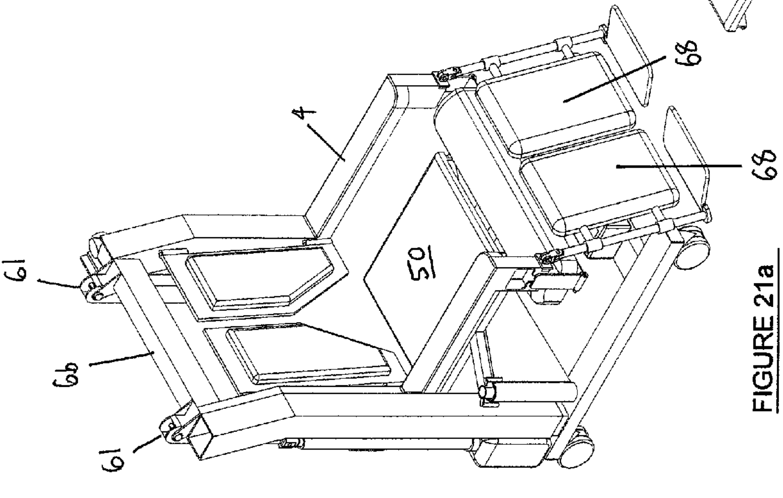

Referring to FIGS. 11*b*, 17*a* and 17*b*, seat cradle 51, is detachably mounted to arm rests 4 by means of automatically releasing mounting brackets 70 which facilitate the placement of a patient onto a bed. As described previously, the chair can be raised and a patient, supported by seat cradle 51 and harness 60, placed over a bed onto which they are lowered. As the patient is lowered, seat cradle 51 will come into contact with the mattress surface and the patient will at this stage be seated on the bed. As the chair is lowered further to slacken the harness 60 which can then be removed from the patient, seat cradle 51 will be pushed upwardly by the mattress in the direction shown by arrow A in FIG. 17*a*. This causes hinged end plates 71 to move upwardly about retaining bosses 72 whose heads are then able to pass through complementary keyhole shaped apertures 73 thus enabling said end plates 71 to be moved away from the arm rests 4 and seat cradle 51 to be released. Upon release, seat cradle 51 and then be removed from under a patient's thighs and the patent laid down as the chair is moved away from the bed. Seat cradle 51 can then be readily reattached to the chair using handgrips 74. As shown in FIGS. 11*a* and 14*d* seat cradle 51 is also adapted to receive movable leg supports 65 which provide support to the lower limbs of a patient while seated (FIG. 14*d*) or while being lifted onto a bed. Leg supports 65 are provided with rams 66 (FIG. 11*a*) or other suitable actuators which pivot said leg support upwardly so that a patient's lower limbs are raised upwardly. As shown In FIGS. 21*a* and 21*b* such leg supports may also comprise separate supports 68, each adapted to support an individual leg. A chair in accordance with the invention may also comprise a foot rest 69 that is pivotally mounted to the chassis 2 as shown in FIG. 11*b*.

As described previously, a harness 60 or sling can be employed to help maintain a patient upright during toileting or transfer to a bed. In use a harness 60 is attached to harness supports 61 which extend in use from cross member 6*b* as shown in FIGS. 14*c* and 14*d*. When not in use, harness supports 61 can be rotated back into a stowed position along cross member 6*b* as shown in FIGS. 11*a* and 11*b* or may be pivoted rearwardly behind cross member 6*b* as shown in the embodiment illustrated in FIG. 21*a*.

As shown in the Figures, the chair can employ seat back 56 that comprises a single member 56*a* (FIG. 11*a*, 11*b*) or two separate folding members 56*b* (FIGS. 20*a*, 20*b*, 21*a*, 21*b*). In either case, an extensible buckle 57 is provided between height adjustable mast 6*a* and an adjacent arm rest 4 assembly as shown in FIGS. 12*b*, 14*b*, 16*b*, and 21*b* so that the seat remains rigidly supported throughout the extension of cross member 6*b*.

Figure 18:
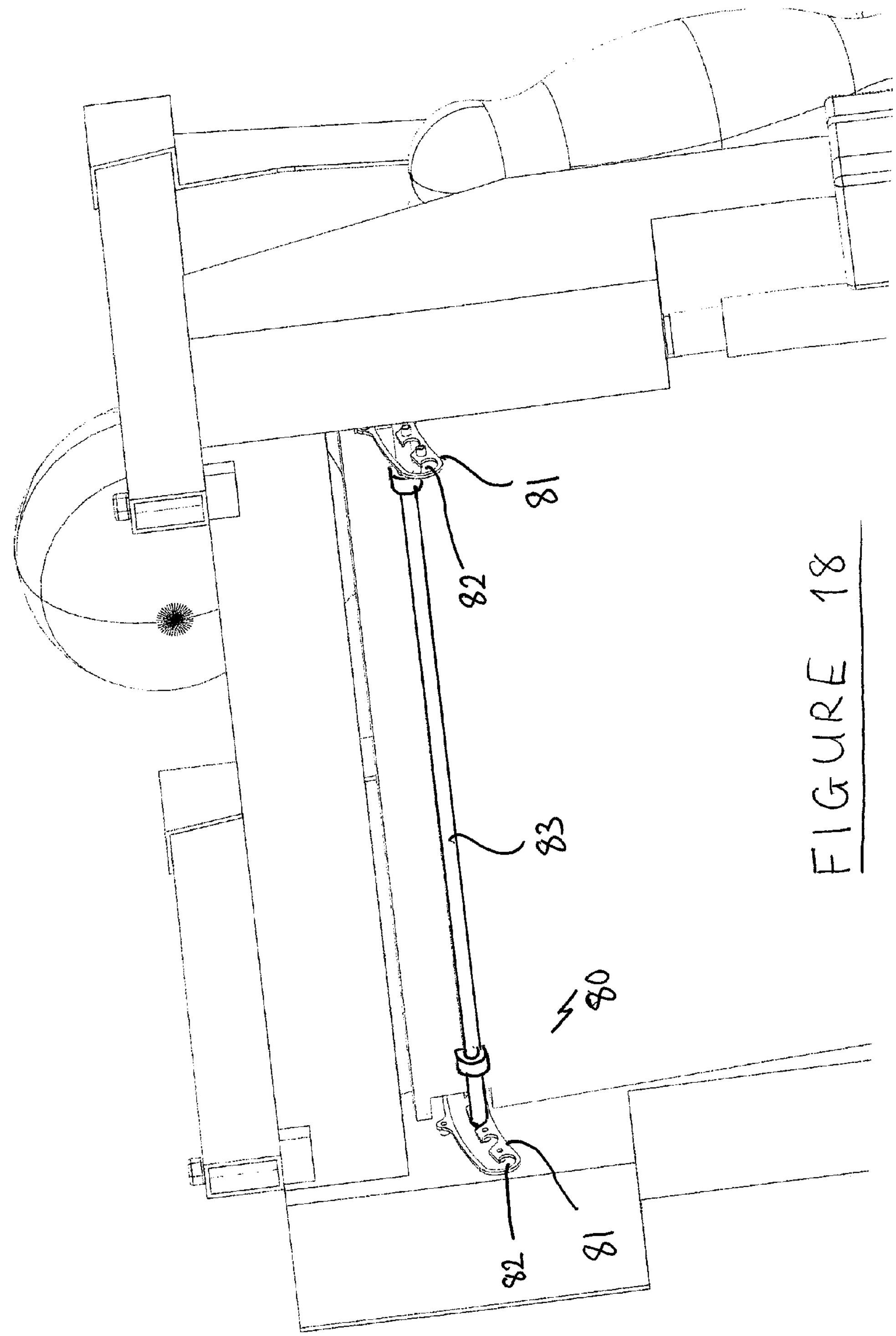
FIG. 18 is a detailed view of a seat back inclination adjustment mechanism in accordance with aspects of the invention.

Referring to FIG. 18, in accordance with another aspect of the invention, there is provided a seat back adjustment means 80 which enables the inclination of said seat back 56 to be altered, the adjustment means 80 comprising one or more brackets 81 having a plurality of detents 82 into which the ends of an adjuster bar 83 are placed in locking engagement.

Aspects of the present invention have been described by way of example only and it should be appreciate that additions and/or modifications may be made thereto without departing from the scope thereof.

The invention claimed is:

1. A chair comprising a chassis having a plurality of ground engaging wheels, a seat comprising a rear seat section and a seat cradle, a back support frame, wherein the back support frame comprises a height adjustable mast that is affixed at its lower end to the chassis, and a cross member that is connected to the height adjustable mast and which extends substantially across the width of the chair, the chair being arranged so that the seat cradle can be raised relative the chassis, wherein the rear seat section and the seat cradle are mounted to the chassis such that they are independently movable relative to each other and to the chassis while a patient is sitting on the chair and such that the rear seat section can be rotated away and/or the seat cradle raised so as to allow access to remove clothing for toileting while the patient is still seated as supported by the seat cradle.

2. The chair of claim 1, wherein the height adjustable mast is connected towards one side of the chassis.

3. The chair of claim 1, wherein the seat cradle extends between arms rests which are connected to the cross member.

4. The chair of claim 1, wherein the cross member is length adjustable so that the seat cradle can be moved laterally relative to the height adjustable mast.

5. The chair of claim 1, wherein at least one of the height adjustable mast and the cross member is telescopically extensible.

6. The chair of claim 1, wherein the rear seat section is rotatably mounted to the chassis such that it can be rotated away from the chassis when the seat cradle is raised so as to enable the chair to be positioned over a toilet bowl.

7. The chair of claim 6, wherein the rear seat section is mounted to the chassis such that it can be folded flat against the side of the chassis thereby minimizing the footprint of the chair.

8. The chair of claim 7, wherein the rear seat section is provided with a seat support member that is pivotally mounted to the chassis so as to be rotatably movable with the rear seat section which collects the seat support member during rotating motion by means of a cam mechanism.

9. The chair of claim 8, wherein rotation of the rear seat section and seat support member is effected by a pedal activated spring operation means.

10. The chair of claim 1, wherein the cross member is provided with at least one harness support which is pivotally mounted to the cross member.

11. The chair of claim 3, wherein the seat cradle is detachably mountable to the arm rests by means of automatically releasing mounting brackets.

12. The chair of claim 11, wherein the mounting brackets comprise a hinged end plate which move upwardly when the seat cradle is forced upwards, the hinged end plate detaching from fixed retaining bosses provided on the arm rests.

13. The chair of claim 12, wherein the retaining bosses are adapted to extend through and releasably engage with complementary keyhole shaped apertures provided in the end plates.

14. The chair of claim 1, wherein the seat cradle is adapted to receive movable leg supports which provide support to the lower limbs of a patient while seated or being raised on the chair.

15. The chair of claim 1, wherein the chair further comprises a seat back having adjusting means which enables the inclination of the seat back to be adjusted, the adjusting means comprising at least one bracket having a plurality of detents into which the ends of an adjuster bar are placed in locking engagement.

* * * * *